Nov. 13, 1951 G. R. ERICSON 2,574,694
METHOD AND MEANS FOR FACILITATING ENGINE STARTING
Filed March 5, 1945 2 SHEETS—SHEET 1

INVENTOR.
George R. Ericson

Nov. 13, 1951     G. R. ERICSON     2,574,694
METHOD AND MEANS FOR FACILITATING ENGINE STARTING
Filed March 5, 1945     2 SHEETS—SHEET 2
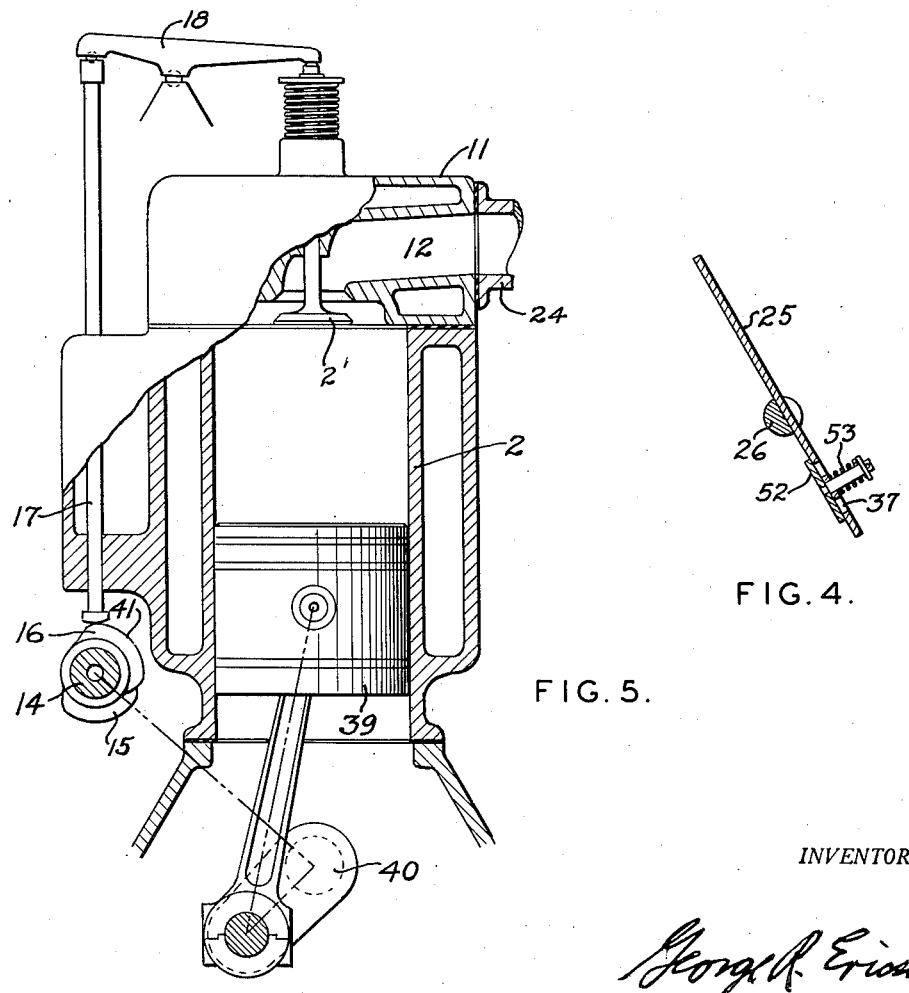
INVENTOR.
George R. Ericson Patented Nov. 13, 1951

2,574,694

UNITED STATES PATENT OFFICE 2,574,694

METHOD AND MEANS FOR FACILITATING ENGINE STARTING

George R. Ericson, Kirkwood, Mo., assignor to Carter Carburetor Corporation, St. Louis, Mo., a corporation of Delaware Application March 5, 1945, Serial No. 581,097

8 Claims. (Cl. 123—52)

This invention relates to improvements in internal combustion engines, and more particularly to a method of supplying combustion air to four-cycle diesel engines, as high speed automotive diesels and the like, and to novel and effective provisions for controlling the supplying of air to such engines, so as to promote and greatly facilitate positive and relatively quick engine starting.

A principal object of the present invention is to provide a method of supplying combustion air to engines of the character indicated, in which cylinder induction of air in the engine starting period, is determined such as to afford a high velocity air flow toward the cylinder upon opening of the cylinder intake valve, and further, such as to produce in the cylinder at the beginning of effective compression consequent to intake valve closure, a volume of combustion air characterized by a pressure at least approximating atmospheric pressure and a temperature exceeding that of the atmospheric air source, whereby to determine the ultimate pressure and temperature of compression of the cylinder combustion air, at values sufficient to promote quick engine starting.

A further principal object of the invention is to provide in an engine of the character indicated, an improved cylinder air induction or intake system including automatic intake control means and a timing of cylinder intake valve operation to include valve closure at a predetermined time following termination of the cylinder suction cycle, wherein the system according to the present improvements, is effective during the engine starting period, to determine and control cylinder induction of air in a manner to assure relatively high cylinder compression pressures, as well as high compression temperatures, in the several cylinders at the end of cylinder compression, whereby to promote positive and quick engine starting, as well as relatively rapid engine warm-up and consequent early attainment of normal running conditions.

Objectively to the foregoing, the automatic air intake control provisions in the present induction system, include valve means effective during engine starting when piston speeds are relatively low, to promote high cylinder suction and consequent high depression in the system, and to establish high velocity air intake to the engine cylinders. As a result of the latter in particular and further in consequence of intake valve timing such that valve closure occurs following cylinder suction, as early in the cylinder compression cycle, there will obtain in each cylinder at the time of intake valve closure, a volume of combustion air under a pressure at least closely approaching, but normally equal to or even appreciably exceeding atmospheric pressure. Consequently, the ultimate or final cylinder pressure and temperature of compression obtaining at the end of compression in each cylinder during the engine cranking period, will be sufficiently high to facilitate quick engine starting through resulting positive ignition and combustion of the engine fuel.

Another important object of the invention resides in the provision of an improved air induction system of the character hereinabove indicated, wherein the intake air supplied thereby to the engine cylinders during the engine starting period in particular, is warmed to an appreciable degree, so as further to facilitate positive and quick engine starting. In the present system, advantage is taken of the kinetic energy possessed by the high velocity intake air flow established in the engine starting period, as a source of heat for warming the intake air, the heat energy for this purpose being derived from the kinetic energy of the air flow as an inherent result of the character of air intake control afforded by the present improvements.

A further object resides in a division of air supply to the cylinders of a multi-cylinder engine of the character indicated, wherein the presently improved character of cylinder air induction is determined and controlled separately as to each of several groups of cylinders, so that the intake valves of each cylinder group may be operated in relatively timed relation such as to avoid any substantial overlapping of the open periods thereof. In consequence of the latter, the functioning of the present cylinder air induction system is enhanced to a material degree, since at any given time, only one of the cylinders of a group is undergoing the full air induction cycle as herein provided, thus avoiding air flow interference and inaccuracy of air induction control which otherwise would tend to occur.

A still further object is attained in respect to the presently improved air induction system having valve means effective during the engine starting phase, to determine high velocity air flow to the engine cylinders in the cylinder suction cycle, by the provision of control facilities operable responsively to a condition of air flow determined in a region of the supply passage in the induction system, and to a condition of the engine obtaining during warm-up and as normal running conditions are attained, to condition said valve means for permitting air flow through the induction system and to the engine cylinders, in volume and rate of flow fully adequate to supply the engine under normal operation throughout its speed and load range.

Other objects and advantages afforded by the present improvements will appear readily from the following description of an embodiment of the invention, as illustrated in the accompanying drawings, wherein:

Fig. 4 illustrates a modification in the air flow control valve means employed in the induction system; and Fig. 5 is an enlarged somewhat diagrammatic vertical section transversely through a cylinder organization of the engine, illustrating the delayed closure of the intake valve thereof following termination of the cylinder suction cycle.

Fig. 6 is a detail view showing the operative connection of the control valve elements embodied in the present induction control system.

Figure 1:
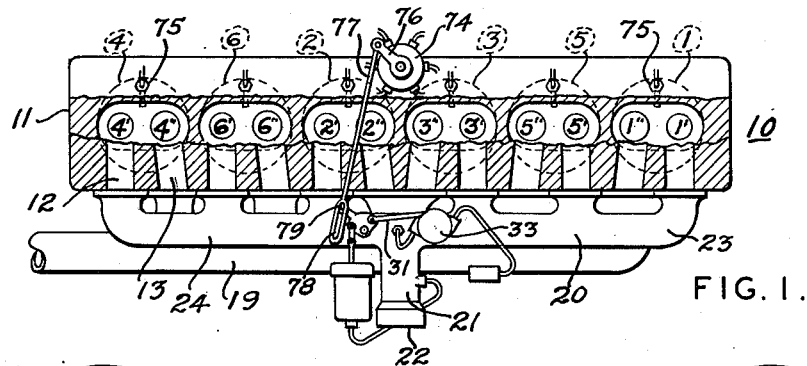
Fig. 1 is a diagrammatic plan-elevation partly in section, of a multi-cylinder engine having the presently improved air induction provisions embodied therein.

While it is presently preferred to illustrate the improved air induction system in application to a six cylinder four-cycle diesel engine as indicated generally at 10 in Fig. 1, it will become obvious as the description proceeds, that the method of cylinder air induction and the induction system of the character now provided, may be applied in general to single or multi-cylinder, four-cycle diesel engines, and with great advantage, to automotive diesels.

Referring first to Fig. 1, the engine 10 shown somewhat diagrammatically and partly in section as to the cylinder head portion thereof, includes six cylinders shown in broken lines and desigated from right to left in the figure in accordance with the preferred cylinder firing order, as cylinders 1, 5, 3, 2, 6 and 4. Associated with the cylinders is a cylinder head structure indicated by numeral 11, providing air admission and exhaust ducts or passages 12 and 13 respectively, for each of the cylinders. Controlling air admission to the cylinders through the ducts 12, are intake valves indicated diagrammatically at 1', 5', 3', 2', 6' and 4' corresponding to the cylinders in that order, while the exhaust ducts 13 are under the exhaust discharge control of similarly shown exhaust valves 1", 5", 3", 2", 6" and 4". The exhaust and intake valves may be actuated in properly timed relation to the engine operating cycle, in any suitable well known manner as by an engine driven camshaft indicated at 14 in Fig. 5, operating at one-half engine speed in the present four-cycle engine, and providing an exhaust cam 15 for each exhaust valve, and a cam 16 for each intake valve. Operation of the valves from the cams may be effected as by rocker arm and push rod devices such as the push rod 17 and rocker arm 18 shown in the diagrammatic view of Fig. 5, arranged between cam 16 and one of the cylinder intake valves, as for example, the intake valve 2' of cylinder number 2 shown in the figure. However, in regard to the timing of intake valve operation and particularly with respect to the time of valve closure in the engine operating cycle, such is here determined in accordance with the objectives of the presently improved induction system, to include a delay in intake valve closure following the cylinder suction cycle. This will be referred to more fully hereafter.

The cylinder exhaust ducts 13 communicate with an exhaust manifold 19 which may be of conventional character, extending to a suitable point of exhaust discharge, while the intake ducts 12 receive air through an intake manifold 20 embodying air intake control provisions according to the present invention. As appears from Figs. 1 and 2, manifold 20 provides an air intake tube or pipe 21 projecting from the midportion thereof and terminating in a relatively wide-mouth atmospheric inlet 22. The pipe 21 thus determines opposite corresponding manifold sections 23 and 24 individual respectively (Fig. 1), to the intake ducts 12 of cylinders 1, 5, and 3, and to the like intake ducts 12 of cylinders 2, 6 and 4. For purposes herein and as to claim definition, the manifold section 23 together with the associated cylinder ducts 12 and the inlet pipe 21, comprise means affording the cylinder air supply or intake passage to cylinders 1, 5 and 3, while the manifold section 24 with the associated cylinders ducts 12 and inlet pipe 21, constitute a like passage for cylinders 2, 6 and 4.

As objectively indicated hereinbefore, it is the principal purpose of the present invention to provide a method of cylinder air induction and to afford control of engine combustion air intake, such as to promote or contribute materially to quick engine starting, and to attain thereby, rapid warm-up and an early conditioning of the engine for normal running operation. In four-cycle diesel engines and especially in connection with automotive diesels which may be subject at times, to conditions particularly adverse to quick engine starting, as for example, cold weather or when the engine has remained idle or in an inoperative condition for a long period, the attainment of positive and relatively quick starting during engine cranking and when piston displacement is relatively slow, may be greatly facilitated by increasing to a substantial degree, the air pressure and temperature of compression obtaining in each cylinder at the end of its compression cycle. Such is accomplished according to the present invention, by novel and effective combustion air intake control provisions presently to be described, and by a predetermined timing of cylinder intake valve operation of a character to appear, functioning during the engine starting period to determine combustion-air filling of each cylinder undergoing its air-induction cycle, to a degree such that the cylinder air pressure at the time of intake valve closure will substantially equal or even appreciably exceed atmospheric pressure. Also and as an inherent result of the present provisions, the cylinder air temperature at such time, will exceed to a material degree the temperature of the atmospheric air admitted to the induction system at the inlet pipe 21. Consequently, with combustion air at or above atmospheric pressure and at an appreciable temperature, present in the cylinder at the beginning of the effective compression cycle, as upon closure of the intake valve, the air pressure and temperature of compression obtaining at the end of the compression cycle, will attain such relatively high values as will promote positive and quick fuel ignition as fuel is injected into the cylinder, to the end of attaining quick engine starting.

Turning now to the provisions for accomplishing the foregoing, located within the manifold section 24 and near the zone of juncture thereof with inlet pipe 21 (Fig. 2), is a control valve element 25, preferably a plate valve of the "butter-fly" type, which is mounted on a pivot shaft 26 somewhat eccentrically related thereto. Similarly located within manifold section 23 is a like valve element 27 pivoted on a shaft 28 which is eccentrically related to the valve. The pivot shafts 26 and 28 project outwardly of the manifold and on the same side, and to shaft 26 is suitably secured a valve control lever 29. An arm 30 (Fig. 6) secured to the projecting portion of shaft 28, is connected to lever 29 by a link element 31 pivoted at its ends to the arm and lever, as shown. Thus the valves 25 and 27 are connected in tandem, and hence constrained to conjoint corresponding opening and closing movements.

Figure 2:
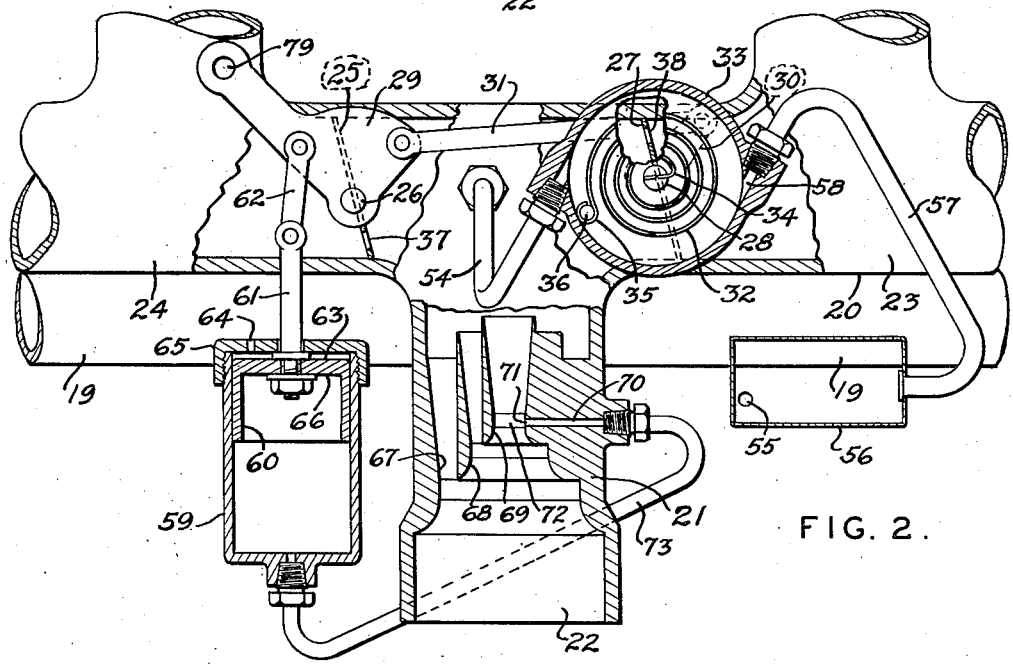
Fig. 2 is an enlarged fragmentary side elevation of the air induction means, with parts thereof shown in section.

In the normal non-operating condition of the engine and also during the engine starting period as will be more fully appreciated hereafter, the control valves are retained in manifold-closing positions as shown in Fig. 2, by control means which acccording to present preference, is of an automatic, thermally-responsive character. In the present example, such control means is provided by a spiral-form, bi-metallic thermostat or thermally-sensitive member 32 which is enclosed preferably in a generally circular or cylindrical housing 33 carried by manifold 20, and has its inner end 34 secured to an extension of valve shaft 28, the latter extending substantially axially within housing 33. The opposite end 35 of member 32 is fixed to the housing as by pin 36, so that the thermostat member thus imposes through shaft 28, a constant bias on the tandem valves 25 and 27. When sufficiently cooled or in a cold condition, the spiral-contraction of the member serves to dispose the valves in the manifold closing positions shown, and through proper selection of the member as to its spring-force characteristics, it is determined to be effective in its cold condition, to hold the control valves closed against the valve opening influence imposed on the valves by means presently to appear. Moreover, since the valves 25 and 27 are eccentrically pivoted so as to be subject in a valve-opening direction, to manifold depression posterior to the valves, the valve-holding force of the thermostat member so selected, must be sufficient to prevent opening of the valves in response to engine suction and consequent manifold depressions of the order attained during engine starting, as this will appear hereinafter, so as to permit attainment of the character of air intake control afforded by the present improvements in the engine starting period.

Upon cranking of the engine in the starting phase, which may be effected in conventional manner, as by a cranking motor (not shown) turning over the engine at a relatively low speed, cylinder induction of air in sufficient volume to support fuel combustion in the cylinders, is determined and controlled in part according to the presently improved induction system, by the plate valves 25 and 27, each of which by present preference, has one or more ports or orifices provided therein. As here shown for example, valve 25 is provided with an orifice 37 and valve 27 with a like orifice 38; these orifices being of calibrated area, predetermined according to the engine to which the system is applied, and to the character of air control to be attained. Since the valves preferably are fully closed at engine starting, the orifices offer at such time substantially the sole air-flow communications between the intake pipe 21 and the manifold sections or branches 23 and 24. Consequently, the ported valves when in closed positions at engine starting, thus introduce as to each manifold section, an intake air-flow constriction anterior to the cylinder intake passages communicating with the section. While it is presently preferred for reasons of greater accuracy of control, to employ calibrated orifices in the plate valves for determining the desired degree of passage constriction in the closed position of each valve, it will be appreciated that approximately the same result may be obtained with valves devoid of ports or orifices therein, by suitable provisions not here shown, as for preventing complete closure of the manifold sections by such valves, so as to leave a small opening about each valve and of a total area equivalent to that determined for the orifice (37 or 38) utilized according to the present arrangement.

Considering the manifold section 24 related to cylinders 2, 6 and 4, and having the control valve 25 therein, when any one of these cylinders, as cylinder number 2 for example, is undergoing its suction cycle with its intake valve 2' full-open (Fig. 5), the resulting cylinder suction tends to produce a corresponding depression in the manifold section 24 posterior to valve 25. Since the valve when in closed position, affords only a small opening as the valve orifice 37, between the atmospheric air intake pipe 21 and the manifold section, the cylinder suction and consequent suction or depression in the manifold, are thus very materially increased, reaching a high value as the piston 39 (Fig. 5) undergoes its maximum rate of displacement in the suction stroke. In consequence of the high cylinder and manifold depression thus afforded, there is induced through the valve orifice 37, a high velocity inflow of combustion air from the supply pipe 21, the air thence traveling toward the cylinder 2 at high velocity attenuated only slightly by reason of frictional losses in the manifold and cylinder intake duct 12. As the piston approaches and attains the end of its suction stroke, the velocity of air intake to the cylinder tends to decrease at a proportionate rate, and is additionally reduced by reason of the rising pressure head as air-filling of the cylinder is approached. However, and for a purpose presently to appear, the degree of manifold constriction afforded by the valve 25 as determined by proper selection of the area of valve orifice 37, is such as to afford at least a low velocity cylinder intake of air as the piston attains the end of its suction stroke.

Figure 3:
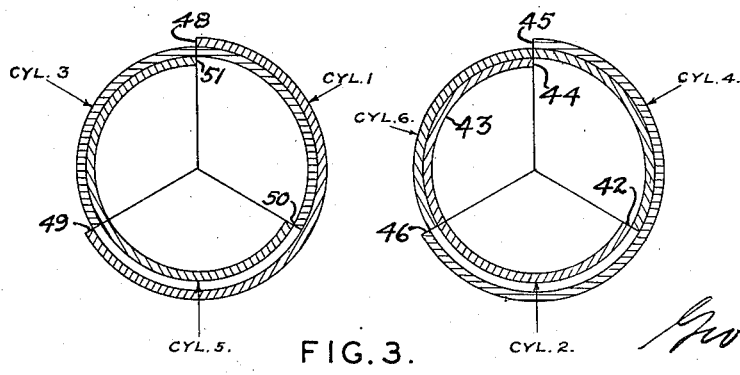
Fig. 3 illustrates diagrammatically, the character of cylinder intake valve timing provided by the present improvements, showing in particular the relative open periods of the several cylinder intake valves.

Continuing as the nature and function of the presently improved induction system with regard to cylinders 2, 6 and 4, but with respect to cylinder number 2 for present example, while there remains a tendency for further slight cylinder intake of air as the piston reaches the end of its suction stroke, nevertheless, at such time the pressure of the air then in the cylinder, will approach in value atmospheric pressure. However, since a purpose of the present invention is to afford the attainment of ultimate high cylinder compression pressures for promoting quick engine starting, further provision is made through timing of intake valve operation, to assure a supply of combustion air in the cylinder at the beginning of the effective compression cycle occurring when the intake valve is fully closed, which will be under a pressure at least closely approximating, but preferably somewhat in excess of atmospheric pressure. Accordingly and as illustrated in Fig. 5, the intake valve operating cam 16 on a camshaft 14, the latter being suitably driven at one-half engine speed preferably through an operating connection (not shown) from the engine crankshaft indicated at 40, is provided with a cam-lobe 41 of such form and predetermined angular extent and so positioned relative to the camshaft, as to be effective through push rod 17 and rocker arm 18, to produce a full-open or nearly full-open condition of the cylinder intake valve at substantially the beginning of the suction stroke of piston 39 (the opening displacement of the intake valve may begin some few degrees of crank travel before top dead center of the piston), and to maintain the valve in open position throughout the ensuing suction period and during an initial period of the piston compression stroke. In the present example, the extent to which intake valve closure is delayed beyond termination of the suction period, is determined in accordance with the herein described characteristics of velocity intake afforded by the suction increasing control valve 25 having the calibrated orifice 37 therein, and is such that valve closure will occur relatively early in the piston compression stroke, as at a point therein represented by piston crank travel of about 60 degrees from the piston position at bottom dead center. This is shown by the diagrams of Fig. 3 which represent by shaded arcs, the relative timing and duration of intake valve opening for the present four-cycle six cylinder engine having the cylinder firing order indicated in Fig. 1. With reference to the right hand diagram thereof, the innermost arc designated by the reference indicia Cyl. 2, concerns the intake valve 2' of cylinder number 2. As there shown, the valve attains an open or nearly full-open position at point 42 corresponding to the beginning of the piston suction stroke, and continues open through the diametrically opposite point 43 corresponding to the piston dead center position at the end of its suction stroke, to the point 44 of actual or substantial valve closure, the latter corresponding to a position of the piston in its compression stroke, determined by crank travel through approximately 60 degrees from its dead center positioning of the piston at the end of the suction cycle.

In consequence of the delayed valve closure thus effected, air intake toward the cylinder, may continue as the piston attains the end of its suction stroke and starts upon its return stroke in the following compression cycle, so long as any degree of suction remains between the cylinder and the ported control valve 25. As all suction effort disappears, the volume of air in the cylinder and in the air supply passage as hereinbefore defined, posterior to valve 25, will be at a pressure at least very closely approximating atmospheric pressure. However, in the present induction system and by reason of the predetermined area of the valve orifice 37 and the further relative timing of intake valve operation as will presently appear, the substantial balancing of cylinder air pressure with atmospheric pressure is obtained at a time following the end of the suction cycle, but appreciably before intake valve closure. Consequently, following the attainment of pressure balance and as piston displacement continues early in the compression cycle, the piston will tend to effect compression of the cylinder air against the volume of air in the intake passage posterior to the valve 25, tending thereby to reject air through the valve orifice 37. However, by reason of the predetermined relatively small area of the orifice, the rejection of any material portion of the air in the intake system posterior to valve 25 in the compression period prior to intake valve closure, will be thereby impeded to an appreciable degree. Accordingly, the cylinder intake system is thus conditioned at this time in the engine cycle, to permit compression of the air in the cylinder, so that when closure of the intake valve occurs to determine the beginning of the effective cylinder compression cycle, the cylinder air will be under compression appreciably above atmospheric pressure. Hence the presently improved induction system may be characterized as one which affords at engine starting in particular, a degree of cylinder supercharging, to the end of promoting quick starting of the engine.

The foregoing may be and is here greatly facilitated by a relative timing of the intake valves associated with cylinders 2, 6 and 4 supplied from manifold section 24, such that there is little if any overlapping of the open periods of the intake valves 2', 6' and 4'. Stated otherwise, intake valve timing as to the above cylinder group, is such that only one cylinder at a time is subjected to the full air induction and pressure increasing action of the system, obtaining through the cylinder suction cycle and about the first 60 degrees of crank movement in the following compression cycle. Hence effective functioning of the induction system as hereinabove described, is thus determined as to each cylinder of the group without disturbance which would otherwise appear under a condition of any appreciable overlap of valve opening periods. Referring again to Fig. 3, the right hand diagram in this figure illustrates by shaded arcs the presently preferred relative timing and duration of intake valve opening for cylinders 2, 6 and 4, obtained by determining the angular extent of the intake valve operating cams (as hereindescribed for cam 16 in Fig. 5), and the relative angular positioning thereof on camshaft 14. As there shown, the arc designated by the indicia Cyl. 4, indicates in clockwise direction, a full or nearly full-open condition for the intake valve of this cylinder at point 45, corresponding to the beginning of the suction cycle, and its continuously open position for about 240 degrees of crank travel (thus being open for approximately the first 60 degrees of crank travel in the compression cycle), to a point 46 of valve closure. At the latter point, the intake valve of cylinder 6 opens or approaches a full-open position and continues open for the succeeding 240 degrees of crank travel, as indicated by the arc designated Cyl. 6, closing at point 42. Similarly with the intake valve of cylinder 2, this opening or approaching full-open position at point 42 and continuing open as represented by the arc designated Cyl. 2, for the next succeeding period of 240 degrees of crank travel, closing at point 44. Thus it will appear that according to the presently preferred example, these valves do not overlap beyond a very negligible amount, as to their open periods in each four cycle operation of the engine.

With respect now to cylinders 1, 5 and 3, and the manifold section 23 associated therewith and having the control valve 27 therein, the induction system operates in exactly the same manner as hereinabove described in connection with cylinder 2, 6 and 4. Valve 27, as before noted, is provided with orifice 38 which is of calibrated area corresponding to that of the orifice 37 in valve 25, while the intake valves of cylinders 1, 5 and 3 are relatively timed so as to avoid any material overlapping of the open periods thereof, and are operated such that each when opened at the beginning of the suction period, remains open through 240 degrees of crank travel. The open relationship of these intake valves which corresponds to that hereinabove described for the intake valves of cylinders 2, 6 and 4, is shown by the left hand diagram in Fig. 3, wherein the intake valve of cylinder 1 indicated as to the extent of its open period by the shaded arc designated Cyl. 1,, opens at point 48 corresponding to the beginning of cylinder suction, and closes at point 49 following 240 degrees of crank travel, at which point the intake valve of cylinder 3 opens and continues open as indicated by the arc designated Cyl. 3, for the next 240 degrees of crank travel, closing at point 50, where the intake valve of cylinder 5 opens and remains open for a like period, as indicated by the extent of the arc designated Cyl. 5, closing at point 51.

It is to be noted here, that although it is preferred in the present example, to effect a timing and duration of intake valve opening such that each valve opens at the beginning of the suction cycle and remains open through and beyond the suction period, to closure at a point of piston displacement relatively early in its compression stroke, as that determined by about the first 60 degrees of crank travel from its bottom dead center positioning of the piston, the time of valve opening relative to the suction cycle, as well as the extent to which valve closure is delayed following termination of the suction cycle, may be varied within limits so as to suit valve timing to any given engine of the character indicated, intended for usual or particular operating conditions, yet such as to afford the character of engine starting air induction control provided by the present invention. Also, it will be now appreciated that the present division of the intake manifold system into two sections each associated with a given group of cylinders, as no more than three thereof in the present example, and each having a ported control valve therein functioning as hereindescribed, greatly facilitates the attainment of the character of intake air control here afforded. Since each section supplies combustion air only to a given three of the cylinders, this readily permits relative timing of the intake valves of these cylinders such as to avoid any substantial overlapping of the open periods thereof, so that the section and its control valve may operate according to the intended air supply function thereof, with respect to but one of the cylinders at a time. This then clearly avoids the character of air flow interference and inaccurate air induction control which otherwise would occur if cylinder induction of air relative to more than one cylinder of the associated group, were permitted to occur at the same time or successively in periods overlapping to any substantial degree.

The presented improved induction system is fully effective during the engine starting period, to determine in each cylinder at the time of intake valve closure, a volume of combustion air under a pressure at least closely approximating atmospheric pressure, but normally under a desirable degree of super-atmospheric pressure. However, the air pressure at such time may be even further increased by effecting closure of the manifold valve orifices 37 and 38 at a point in the operation of the induction system when there exists a tendency for air rejection through the orifices from the engine side of the control valves, as the latter tends to result by reason of piston displacement early in its compression stroke as hereinbefore described. To this end, each of the manifold control valves 25 and 27 may be provided with an inwardly opening valve element or check valve 52, as shown in Fig. 4 at the orifice 37 of valve 25, tensioned toward orifice-closing position by a suitable light spring 53 which preferably, is of a character such that it will offer little or immaterial resistance to the opening of the valve element in the air intake function of the system during engine starting. Thus it will appear that when the air pressure on the engine side of the manifold valve, is such as to result in a tendency for air rejection through the valve orifice, the valve 52 will respond in the direction to close the orifice. Consequently, the volume of air thus trapped in the air supply passage and in the cylinder then open to the passage, may be effectively compressed such as to determine in the cylinder at the time of intake valve closure, a volume of air characterized by an appreciable super-atmospheric pressure.

The present induction system is characterized further by an important function in aid of quick engine starting, in that as a result of the character of high velocity air intake to the engine cylinders afforded by the manifold control or choke valves 25 and 27 having the described calibrated orifices therein, the air is warmed almost from the start of cylinder-intake, and becomes increasingly heated as intake continues and as cylinder air pressure rises prior to intake valve closure. As will be understood, the intake air under high velocity flow during a major portion of the cylinder suction cycle, enters the cylinder against an increasing back pressure developing therein as the cylinder fills with air. Consequently, the increasing resistance to velocity flow imposed by the latter, results in a conversion of the kinetic or velocity energy of the entering air, to heat energy which is absorbed immediately by the air in the cylinder as well as the metal of the exposed piston head and cylinder walls. As thus heated during the engine starting period, the cylinder air normally will attain a very appreciable temperature in each cylinder at or about the end of the suction cycle thereof, and at such time may reach a temperature of the order of 30 degrees Fahrenheit above that of the atmospheric air admitted to the intake pipe 21. Moreover, as the cylinder air pressure rises during the early stages of piston displacement in its compression stroke and up to the point of intake valve closure, the air is heated to an additional extent as a result of the degree of air compression then obtaining. Hence, at the beginning of the effective compression cycle, as when the intake valve is closed, the volume of combustion air then in the cylinder, will be characterized not only by a super-atmospheric pressure, but importantly to engine starting, by a temperature very considerably above the temperature of the atmospheric air source, as the air supply at the manifold intake pipe 21.

Once the engine starts to operate under its own power and as it warms up, the manifold restricting valves 25 and 27 are displaced somewhat gradually toward full-open positions to condition the intake system for unrestricted air intake normally required during engine running when the rate of piston displacement greatly exceeds that obtaining during engine cranking in the starting period. Opening of the control valves may be and is here attained automatically and in response to engine warm-up and air intake conditions obtaining as the engine approaches normal operation. Referring to Fig. 2 in particular, the thermostatic element 32 which when cold, serves to dispose and hold manifold valves 25 and 27 in their closed positions, is subjected to air heated by the engine exhaust gases, so as to produce an expansion thereof serving to turn pivot shaft 28 in the direction (counter-clockwise as observed in Fig. 2) to swing the connected control valves toward full-open positions in the manifold sections 23 and 24. Air flow into contact with the thermostat is afforded by manifold suction, which may be applied in the thermostat housing 33 through a suction connection 54 in tangential communication with the interior of housing 33, and extending to a point preferably in the manifold throat opposite the intake pipe 21. The suction thus imposed in housing 33, is utilized to induce intake of atmospheric air through an opening or port 55 in a heater or stove 56 arranged in air-heating relationship to the engine exhaust manifold 19, and thence through the stove and a conduit 57 to housing inlet 58 entering tangentially as shown. Air discharge from the housing 33 is effected through the suction connection 54 into the manifold. It will appear that by reason of the opposite tangential intake and discharge openings to the housing 33, air increasingly heated in stove 56 by heat-transfer from the exhaust gases in manifold 19 as the engine warms up, and drawn into and through the housing 33, will traverse the latter in a swirling or turbulent manner. Consequently, the heated air is thus caused to flow about and in contact with all surfaces of the thermostat 32, whereby to assure a positive and rapid response of the thermostat in its expansion to open the manifold valves. As the engine assumes and continues normal operation, the induced exhaust-heated air flow will continue through the thermostat housing, whereby to maintain the thermostat in expanded condition so as to hold the valves 25 and 27 in their open positions. It will be noted of course, that during engine cranking, some degree of air flow is induced through the thermostat housing, but since such air is then at atmospheric temperature, and further, since the thermostat 32 as here employed, is determined to be responsive in the expanding direction beyond its cold contracted position, only to an appreciable temperature, as that of air heated by engine exhaust gases under discharge through the exhaust manifold, the thermostat will remain in contracted condition until appreciable exhaust heating of air occurs in stove 56.

In order to assist valve-opening by the thermostat as it is heated in the engine warm-up period, as well as to assure valve-opening movement and retention of the valves in open positions should the thermostatic element 32 fail for any reason to function properly or rapidly enough to condition the intake system for normal engine operation, it is presently preferred to include a pneumatic or suction-operated device normally working in conjunction with or supplementing the action of the thermostat, to open and hold open the manifold valves 25 and 27. As shown in Fig. 2, a cylinder 59 suitably supported (not shown) as on the intake manifold 20 or the inlet pipe 21 thereof, has a piston 60 therein which is connected by piston rod 61 and link 62 to the manifold-valve operating lever 29. One side of the piston as the head surface 63 thereof, is exposed to atmospheric pressure through an air opening 64 in the cylinder cap 65, while the opposite piston head surface 66 is subjected to subatmospheric pressure or suction induced in the cylinder from an appropriate point in the engine air intake passages or manifold structure. According to present preference, the intake pipe 21 is formed to provide a suction-compounding Venturi assembly including substantially concentrically related Venturi passages 67, 68 and 69, and a lateral passage 70 terminating in a suction port 71 preferably in the throat 72 of the innermost Venturi passage 69. Passage 70 as appears, is connected through pipe or conduit 73, with the interior of cylinder 59, whereby suction may be induced in the cylinder in response to suction effort applied at port 71. The Venturi passages are so proportioned as to offer no more than a minimum or immaterial restriction to the intake air flow required under warm-up and normal running conditions of the engine, and to produce under starting conditions when manifold valves 25 and 27 are closed, a suction effort at port 71 which is insufficient to cause suction displacement of piston 60 against the resistance offered by thermostat 32 in its contracted position. However, as the engine begins firing and warms up, and the valves 25 and 27 move toward open positions under the influence initially at least, of the expanding thermostat, the suction effort at Venturi port 71 resulting from the air intake through the venturis at the increased rate then obtaining, will become increasingly pronounced such as to induce a suction in the cylinder 59 amply sufficient to cause piston displacement in the direction to open the manifold valves 25 and 27. Thus the suction-operated device is fully effective under the latter conditions, not only to assist valve-opening by the thermostat, but to assure opening of the valves as the engine attains normal operation, the device to this end being capable of acting independently of the thermostat once the valves 25 and 27 move beyond manifold-closed positions to an extent permitting increased air intake and a consequent suction at port 71 of an order sufficient to effect displacement of piston 60 against any lagging resistance offered by the thermostat 32.

It is presently preferred to provide additionally, a control connection between the control valves 25 and 27 and the engine fuel control or throttle device, capable of opening the manifold valves independently of the thermostat and pneumatic devices hereinabove described, beyond the engine idling position of the throttling device. As diagrammatically illustrated in Fig. 1, an engine-operated fuel pump assembly indicated generally at 74, and which may include fuel pumps of well-known or conventional character individual to the several engine cylinders, is provided to deliver fuel under pressure to cylinder injection valves 75 of conventional air-less injection type. The fuel pumps (not shown) in the assembly 74 may be arranged so that fuel-quantity delivery by the pumps may be controlled by a single throttling device (not shown) as for regulating engine speed and power output under varying load conditions. Actuated coextensively with operation of the throttling device, is a lever 76, to the end of which is pivoted one end of a link 77. The opposite end of link 77 is formed to provide a slot 78 of suitable extent, to receive a pin 79 carried at the end of an extension of valve lever 29, thereby providing a lost-motion connection between the lever and throttle link. With the valves 25 and 27 in closed position and the throttle-operated arm or lever 76 in the position shown in Fig. 1, corresponding to minimum fuel or engine idling position of the throttle, the pin 79 will occupy a position relative to the link, substantially at the inner end of the link slot 78. Accordingly, as the engine is started and attains normal running, under idling conditions, the thermostat and pneumatic devices associated with valves 25 and 27, may function to effect full-open positions of the valves, when the pin 79 will have been displaced substantially to the opposite or outer end of the link slot 78. However, if for any reason the throttle should be operated in the direction to increase fuel delivery at a time when the valves 25 and 27 are in closed positions or only partly open, the throttle-operated arm 76 then turning in a counter-clockwise direction as viewed in Fig. 1, will effect through link 77 and pin 79, opening movement of the valves 25 and 27 to a corresponding extent. The importance of the present throttle connection with valves 25 and 27 resides in the independent control of the latter as afforded thereby, so as to assure during engine operation, an open condition of the valves at least corresponding to throttle positions, in the event the thermostat and pnuematic devices fail for any reason to effect sufficient opening of the valves as the engine warms up and attains running operation.

It is to be understood of course, that the foregoing is intended to be illustrative of the invention and not limiting, as all such modifications as come within the spirit and scope of the appended claims are here contemplated.

I claim:

1. In combination with an internal combustion engine of the character described, having a cylinder air supply passage provided for the supply of combustion air only, to the cylinder, an intake valve in control of cylinder communication with the supply passage, control means in the passage effective solely in the period of engine cranking, such as to determine cylinder induction of air at high velocity toward the cylinder after opening of the intake valve, and intake valve operating means adapted to delay intake valve closure to a time following termination of the cylinder suction cycle, said control means acting in conjunction with the delayed intake valve closure, to determine in the cylinder at the time of intake valve closure, a volume of combustion air characterized by a pressure at least approximating atmospheric pressure.

2. In combination with an internal combustion engine of the character described, having a cylinder air intake passage provided for the supply of combustion air only, to the cylinder, an intake valve in control of cylinder communication with the intake passage, engine operated means for actuating the intake valve, adapted to open said valve in the cylinder suction cycle and to delay closure thereof to a predetermined time following the end of the suction cycle, and a ported valve element in the intake passage effective in the period of engine starting to determine cylinder induction of air at high velocity toward the cylinder upon opening of the intake valve, said valve element serving in cooperation with the delayed closure of the intake valve, to determine in the cylinder at the time of intake valve clousre, a volume of combustion air under a pressure in excess of atmospheric pressure.

3. In combination with an internal combustion engine of the character described, having a cylinder air intake passage provided for the supply of combustion air only, to the cylinder, an intake valve in control of cylinder communication with the intake passage, engine operated means for actuating the intake valve, adapted to open said valve in the cylinder suction cycle and to delay closure thereof to a predetermined time following the end of the suction cycle, and a ported valve element positionable in the intake passage in the period of engine starting, to afford a constriction therein of a predetermined order such as to determine cylinder induction of air at high velocity toward the cylinder upon opening of the intake valve, said valve element serving thereby and in cooperation with the delayed closure of the intake valve, to determine in the cylinder at the time of intake valve closure, a volume of combustion air characterized by a pressure in excess of atmospheric pressure and a temperature above that of the atmospheric air source.

4. A fuel burning engine of the four-cycle type having a cylinder, a piston, inlet and outlet valves for said cylinder, a crankshaft for operating said piston, means driven by said crankshaft for operating said valves, said means being constructed and arranged to open said inlet valve near the beginning of the intake cycle, and to close said inlet valve at a point substantially after the end of said intake cycle, an intake conduit, a valve in said intake conduit anterior to the inlet valve, means for holding said valve in a flow restricting position during cranking of the engine, and means for moving said last named valve to inoperative position when the engine is running at normal speed.

5. The method of facilitating diesel engine starting which comprises the steps of controlling by throttling the induction of air to each cylinder solely in the period of engine cranking by substantially increasing air velocity to the cylinder in the cylinder suction cycle, and timing the induction to terminate by intake valve closing when ramming velocity into the cylinder becomes ineffective for charging.

6. The method of facilitating starting of a diesel engine which comprises the steps of controlling by throttling the induction of air to each cylinder separately and at least to two groups of cylinders thereof solely in the period of engine cranking by substantially increasing air induction velocity to each cylinder during its suction cycle and timing the induction to terminate by intake valve closing when ramming velocity into the cylinder becomes ineffective for charging.

7. The method of facilitating diesel engine starting which comprises the steps of controlling by throttling the induction of air to each cylinder solely in the period of engine cranking by substantially increasing air velocity to the cylinder in the cylinder suction cycle, timing the induction to terminate by intake valve closing when ramming velocity into the cylinder becomes ineffective for charging, and reducing the induction velocity as the engine attains a normal running condition.

8. The method of facilitating diesel engine starting which comprises the steps of controlling the induction of air to each cylinder in the period of engine cranking by substantially increasing air velocity to the cylinder in the normal cylinder suction cycle, maintaining the intake valve open as the compression cycle begins, whereby a ramming effect is produced by the opposed motion of the high velocity intake air and the direction of piston motion, and timing intake valve closing to occur substantially simultaneously with termination of ramming velocity.

GEORGE R. ERICSON.

REFERENCES CITED

The following references are of record in the file of this patent:

UNITED STATES PATENTS

| Number | Name | Date |
|---|---|---|
| 682,567 | Reichenbach | Sept. 10, 1901 |
| 1,005,701 | Friend | Oct. 10, 1911 |
| 1,051,866 | Delaunay | Feb. 4, 1913 |
| 1,116,364 | Baker | Nov. 10, 1914 |
| 1,144,433 | Riker | June 29, 1915 |
| 1,213,499 | Johnson | Jan. 23, 1917 |
| 1,234,855 | Barthel | July 31, 1917 |
| 1,360,041 | Spohrer | Nov. 23, 1920 |
| 1,384,133 | Howe | July 12, 1921 |
| 1,550,649 | Remington | Aug. 18, 1925 |
| 1,604,603 | Powell | Oct. 26, 1926 |
| 1,610,888 | Sauer | Dec. 14, 1926 |
| 1,612,377 | Jepson | Dec. 28, 1926 |
| 1,688,164 | Tarrant | Oct. 16, 1928 |
| 1,733,975 | Osterhout | Oct. 29, 1929 |
| 1,763,726 | Timian | June 17, 1930 |
| 1,766,854 | Trussell | June 24, 1930 |
| 1,914,063 | Barbarou | June 13, 1933 |
| 1,969,358 | Coffelder | Aug. 7, 1934 |
| 1,996,245 | Hunt | Apr. 2, 1935 |
| 2,025,723 | Chandler | Dec. 1, 1935 |
| 2,028,585 | Blake et al. | Jan. 21, 1936 |
| 2,030,331 | Smith | Feb. 11, 1936 |
| 2,074,728 | Hunt | Mar. 23, 1937 |
| 2,114,655 | Leibing | Apr. 19, 1938 |
| 2,134,889 | Phillips | Nov. 1, 1938 |
| 2,202,227 | Noland | May 28, 1940 |
| 2,228,733 | Reichhelm | Jan. 14, 1941 |
| 2,281,509 | Mallory | Apr. 28, 1942 |
| 2,283,370 | Jedrzykowski | May 19, 1942 |
| 2,337,982 | Ericson | Dec. 28, 1943 |
| 2,390,019 | Winkler et al. | Nov. 27, 1945 |

FOREIGN PATENTS

| Number | Country | Date |
|---|---|---|
| 549,710 | Great Britain | Dec. 3, 1942 |

OTHER REFERENCES

L. C. Lichty: Internal Combustion Engines, 5th edition published by McGraw-Hill Book Co., Inc., 1939.